Oct. 12, 1971 TAMOTSU MATSUBARA ET AL 3,611,556
METHOD OF MANUFACTURING A ROTOR FOR SMALL
ROTARY ELECTRIC MACHINES
Original Filed Oct. 23, 1968
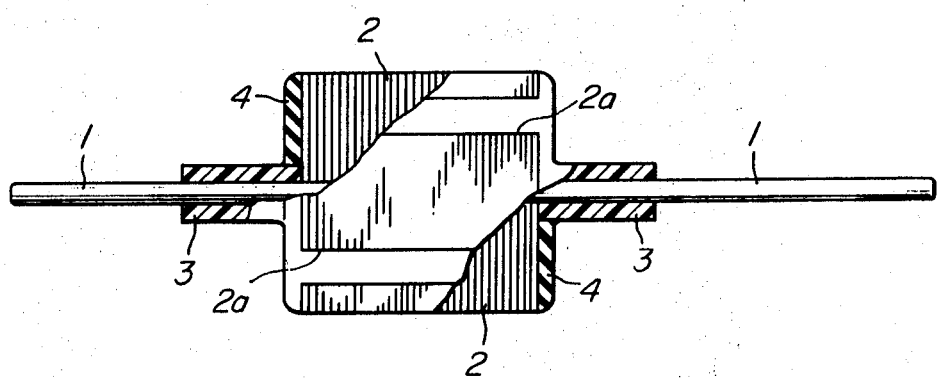
INVENTORS
TAMOTSU MATSUBARA
YOSHIO OKA
KUNIHIRO NONOME
BY Cushman, Darby & Cushman
ATTORNEYS

United States Patent Office 3,611,556
Patented Oct. 12, 1971

3,611,556
METHOD OF MANUFACTURING A ROTOR FOR SMALL ROTARY ELECTRIC MACHINES
Tamotsu Matsubara, Yoshio Oka, and Kunihiro Nonome, Kariya-shi, Japan, assignors to Nippon Denso Company Limited, Kariya-shi, Japan
Continuation of application Ser. No. 770,046, Oct. 23, 1968. This application Jan. 26, 1970, Ser. No. 5,660
Claims priority, application Japan, Jan. 20, 1968, 43/3,693
Int. Cl. H02k 15/02
U.S. Cl. 29—598
2 Claims

ABSTRACT OF THE DISCLOSURE

A rotor in small rotary electric machines of the type comprising a rotary shaft and a rotor core mounted on said rotary shaft and having an insulating film formed on the outer surface thereof by coating with an insulating powder, wherein an insulating sleeve having large mechanical sterngth is fitted on a rotary shaft at least on one side of the rotor core with one end thereof contacting the confronting end face of said core before the insulating powder is coated on the opposite end faces of and the surfaces of grooves formed in said core, and which therefore provides for easy production of the sleeve and enables the bonding of the sleeve with the core to be attained in a highly economical manner.

CROSS REFERENCE TO RELATED APPLICATION

This application is a continuation of our copending application Ser. No. 770,046, filed on Oct. 23, 1968, and now abandoned.

BACKGROUND OF THE INVENTION

Field of the invention

The present invention relates to improvements of the rotor in small rotary electric machines.

Description of the prior art

Referring to the rotor in a conventional small rotary electric machine, it has been a common practice to form steps on the rotary shaft for the positioning of the thrust pads of the bearings for said rotary shaft and a commutator. Such a rotary shaft has been quite uneconomical because it must be produced by machining a large diameter round rod material, and further had the drawback that the production thereof involves a large number of fabrication man-hours. There has been another drawback that the area of the rotary shaft where a rotor core is mounted must be insulated separately.

In recent years, however, an insulation sleeve, e.g. a phenolic resin laminated tube, which has considerable mechanical strength and is highly suitable for use as a member for positioning the thrust pad of the bearing and the commutator, has been developed owing to remarkable progress in the chemical industry, and there is a tendency in the art to use such sleeve on the rotary shaft. However, a problem here is how to secure the sleeve on the rotary shaft or the core mounted on said rotary shaft. Generally, it is conceivable to fix the sleeve on the rotary shaft by means of an adhesive or to fix the sleeve on the rotary shaft by producing the sleeve with an inner diameter slightly smaller than the outer diameter of the rotary shaft and fit the same on the rotary shaft with pressure. However, the former method has the drawback that the process of adhesively fixing the sleeve on the rotary shaft is very complicated, whereas the latter method has the drawback that while the pressure fitting process itself is relatively simple, the sleeve tends to crack if the inner diameter thereof is too small, or the sleeve cannot be rigidly fixed on the rotary shaft if the inner diameter thereof is on the contrary too large, and thus a highly strict dimensional preciseness is required in the production of the sleeve.

SUMMARY OF THE INVENTION

The object of the present invention is to provide a rotor in a small rotary electric machine, which comprises a rotary shaft, a rotor core mounted on said rotary shaft, an insulating sleeve having large mechanical strength and fitted on said rotary shaft at least on one side of said rotor core with one end thereof contacting the confronting end face of said rotor core, and a powder coating applied on both end faces of and the surfaces of grooves formed in said rotor core after said sleeve is fitted on the rotary shaft.

According to the present invention, there is brought about the great advantage that the sleeve can be secured to the rotor core at the same time when the insulating coating is formed on the opposite end faces of and the surfaces of the grooves in the rotor core, whereby there is no necessity of bonding the sleeve on the rotary shaft separately or producing the sleeve with particularly high precision, and a rotor which is provided with means for positioning a commutator and the thrust pad of a bearing can be obtained at very low costs.

BRIEF DESCRIPTION OF THE DRAWING

The accompanying drawing is a front elevation, partially shown in section, of an embodiment of the rotor according to the present invention.

DESCRIPTION OF THE PREFERRED EMBODIMENT

The present invention will be described hereunder with reference to an embodiment thereof shown in the accompanying drawing. A rotor core 2 is composed of juxtaposed thin iron plates and fixedly mounted on a prescribed position of a rotary shaft 1. The core 2 has coil receiving grooves 2a formed therein. Reference numerals 3, 3 designate insulating sleeves, e.g. phenolic resin laminated tubes, having large mechanical strength and fitted on the rotary shaft 1 on both sides of the core 2, with ends thereof in contact with the confronting end faces of said core 2. An insulating coating 4 formed by coating with an insulating powder covers the opposite end faces of the core 2 and the surfaces of the grooves 2a.

The rotor of the present invention having a construction as described above will be assembled in the following manner. First of all, the core 2 is fixedly mounted on the rotary shaft 1 and then the assembly of the core and the rotary shaft is preheated. In this case, the preheating temperature must be higher than the melting point of the insulating powder which is used in the powder coating step to be described later. Immediately thereafter, the insulating sleeves 3, 3 are fitted on the rotary shaft 1 on both sides of the core 2 in such a manner that ends thereof are held in contact with the confronting end faces of said core 2, and then the insulating powder is coated on said end faces of the core 2 and on the surfaces of the grooves 2a. Thereby, the insulating coating 4 is formed on the aforesaid faces of the core 2 and simultaneously the sleeves 3, 3 can be fixed to the core 2 by the insulating coating 4.

For coating with powder, either the spray coating method or the dip coating method may be employed. As insulating powder, various powders, such as thermoplastic resin powders and thermosetting resin powders, may be used, but considering the bonding strength between the sleeves 3, 3 and the core 2, it is desirable to obtain a sufficient bonding strength between both members with a necessary minimum thickness of the insulating coating 4. Therefore, powders of epoxy resins, which are thermosetting resins, are advantageously used. Of course, the powders used are not restricted only to epoxy resin powders.

If necessary, the assembly may be heated after coating with insulating powder, to cure said powder coating. This subsequent heating step may be omitted because the assembly to be coated is relatively large in heat capacity and can be preheated to elevated temperatures, and because the coated powder can be cured with the heat of the preheated assembly when the powder used is quickly curable.

Next, an embodiment of the rotor according to this invention, as used in an electric motor for operating a windshield wiper of an automotive vehicle, will be illustrated quantitatively. An assembly of a rotary shaft and a rotor core mounted thereon, was first of all preheated to a temperature of 250±10° C. and immediately thereafter, insulating sleeves each consisting of a phenolic resin laminated tube were fitted on the rotary shaft on both sides of the core in such a manner that ends thereof abut against the confronting end faces of the core respectively. Then, an epoxy resin powder was coated on the core to form an insulating coating covering the opposite end faces of the core and the surfaces of the grooves as shown in the drawing, and the assembly was left to stand for at least one minute to allow the insulating coating to cure. Upon curing, the thickness of the coating film, that is, the thickness of the insulating coating, at the end faces of the core was 0.3 to 0.4 mm. After cooling, the bonding strength of the sleeve or the phenolic resin laminated tube to the core was measured by a torque meter and it was found that the bonding strength was 5 kg./cm. or greater for both sleeves. This strength is obviously large enough to be durable for practical use.

Although in the embodiment described herein, the insulating sleeves are provided on both sides of the core, it is to be understood that the insulating sleeve may be provided only on one side of the core where the positioning of a commutator is effected by means of a jig.

What is claimed is:
1. A method of manufacturing rotors for rotary electric machines, said rotors being adapted to be subsequently wound, comprising the steps of:
   mounting a core having a pair of oppositely facing end faces and formed with a plurality of coil receiving grooves therein fixedly on a rotary shaft,
   heating said shaft and core assembly to a temperature greater than the melting point of an insulating powder,
   immediately thereafter fitting at least one insulating sleeve on said rotary shaft such that an end thereof is in contact with a confronting end face of said core, and
   coating said end faces and the surfaces of said grooves formed in said core with an insulating thermosetting epoxy resin powder while said shaft and core assembly are still hot whereby curing of the insulating powder by the heat of said core and shaft will be effected to thereby bind said insulating sleeve to said confronting end face, the amount of insulating powder coated on said end faces being sufficient to form a coating at least 0.3 millimeter in depth.

2. The method defined in claim 1 including the additional step of heating said shaft, said core and said sleeve after said coating and curing step to further cure said insulating powder applied to said core.

References Cited
UNITED STATES PATENTS

| | | | |
|---|---|---|---|
| 2,822,483 | 2/1958 | De Jean et al. | 310—45 |
| 2,831,991 | 4/1958 | Perkins | 310—43 |
| 2,997,776 | 8/1961 | Matter et al. | 117 |
| 3,122,667 | 2/1964 | Baciu | 310—215 X |
| 3,261,707 | 7/1966 | Korski et al. | 117 |

FOREIGN PATENTS

| | | |
|---|---|---|
| 255,222 | 6/1948 | Switzerland. |

JOHN F. CAMPBELL, Primary Examiner

C. E. HALL, Assistant Examiner

U.S. Cl. X.R.

310—42, 45, 215, 217